(12) United States Patent
Bathelet (10) Patent No.: US 11,907,784 B2
(45) Date of Patent: Feb. 20, 2024

(54) METHOD FOR ASSOCIATING A MARKING WITH AN OBJECT

(71) Applicant: KONATIC, Vourles (FR)

(72) Inventor: Guillaume Bathelet, Brignais (FR)

(73) Assignee: KONATIC, Vourles (FR)

( * ) Notice: Subject to any disclaimer, the term of this patent is extended or adjusted under 35 U.S.C. 154(b) by 164 days.

(21) Appl. No.: 17/420,625

(22) PCT Filed: Jan. 6, 2020

(86) PCT No.: PCT/FR2020/050013
§ 371 (c)(1),
(2) Date: Jul. 2, 2021

(87) PCT Pub. No.: WO2020/144425
PCT Pub. Date: Jul. 16, 2020

(65) Prior Publication Data
US 2022/0108142 A1    Apr. 7, 2022

(30) Foreign Application Priority Data

Jan. 7, 2019 (FR) ...................... 1900129

(51) Int. Cl.
| | |
|---|---|
| G06K 19/06 | (2006.01) |
| B41M 5/26 | (2006.01) |
| G06K 7/10 | (2006.01) |
| G01B 11/14 | (2006.01) |
| G06Q 30/018 | (2023.01) |

(52) U.S. Cl.
CPC ....... *G06K 19/06159* (2013.01); *B41M 5/262* (2013.01); *G01B 11/14* (2013.01);
(Continued)

(58) Field of Classification Search
CPC ......... G06K 19/06159; G06K 7/10861; G06K 19/06028; G06K 2019/06271;
(Continued)

(56) References Cited

U.S. PATENT DOCUMENTS

| | | | |
|---|---|---|---|
| 9,365,310 B2 * | 6/2016 | Stevens | ................... B65C 9/44 |
| 2006/0092515 A1 * | 5/2006 | Kim | ...................... G02B 27/48 |
| | | | 359/566 |

(Continued)

FOREIGN PATENT DOCUMENTS

WO    2015/001255    1/2015

OTHER PUBLICATIONS

International Search Report for PCT/FR2020/050013 dated Mar. 23, 2020, 5 pages.
(Continued)

*Primary Examiner* — Tuyen K Vo
(74) *Attorney, Agent, or Firm* — NIXON & VANDERHYE (57) ABSTRACT

Disclosed is a method for associating a marking with an object, including the following steps: —identifying the position of at least two different elements of the marking in relation to the marking and/or the object; and—measuring a relative distance between at least two identified elements; then—recording in a database the position of at least two identified elements, and the relative distance between the identified elements so that the position of two identified elements is correlated with the measurement relating to their distance.

8 Claims, 3 Drawing Sheets

(52) U.S. Cl.
CPC ... *G06K 7/10861* (2013.01); *G06K 19/06028* (2013.01); *G06K 2019/06271* (2013.01); *G06Q 30/018* (2013.01)

(58) Field of Classification Search
CPC ............... G06K 19/086; G06K 19/10; G06K 19/06009; B41M 5/262; G01B 11/14; G06Q 30/018; G06Q 30/0185; G06Q 10/0833
See application file for complete search history.

(56) References Cited

U.S. PATENT DOCUMENTS

| | | | |
|---|---|---|---|
| 2006/0262182 A1* | 11/2006 | Robbins | G09F 3/00 347/257 |
| 2008/0304525 A1* | 12/2008 | Kupisiewicz | C03C 23/0025 347/225 |
| 2010/0102032 A1* | 4/2010 | Bathelet | C03C 23/0025 216/84 |
| 2013/0120517 A1* | 5/2013 | Krief | B41M 5/262 347/224 |
| 2017/0286735 A1 | 10/2017 | Lazzouni et al. | |
| 2017/0312851 A1* | 11/2017 | Sun | B23K 26/0648 |
| 2018/0157946 A1* | 6/2018 | Landry | G06K 1/121 |
| 2018/0251865 A1* | 9/2018 | Dajnowski | C21D 1/34 |
| 2020/0273282 A1* | 8/2020 | Olmstead | G06K 7/10722 |

OTHER PUBLICATIONS

Written Opinion of the ISA for PCT/FR2020/050013 dated Mar. 23, 2020, 6 pages.

* cited by examiner

METHOD FOR ASSOCIATING A MARKING WITH AN OBJECT

This application is the U.S. national phase of International Application No. PCT/FR2020/050013 filed Jan. 6, 2020 which designated the U.S. and claims priority to FR Patent Application No. 1900129 filed Jan. 7, 2019, the entire contents of each of which are hereby incorporated by reference.

TECHNICAL FIELD TO WHICH THE INVENTION RELATES

The invention relates to the technical field of reading a marking made on or in a transparent or translucent object. In a preferred but non exclusive application, the invention relates to reading two-dimensional codes such as Datamatrix engraved or marked on the surface of glass receptacles or containers, passing through a very fast in-line inspection system.

TECHNOLOGICAL BACK-GROUND

The traceability is an increasingly strong constraint in the industry, in particular glass industry. Glass items follow an increasingly complex manufacturing, distribution and filling process. Now, the regulation imposes that every step carried out by the food containers can be identified at any time.

In order to meet the regulatory requirements, it is known to apply at the surface of an item a so-called safety label. A safety label has, on one side, a marking that is specific to it and, on the other side, an adhesive layer for its fastening to a glass item, for example. The adhesive layer is characterized by an extremely high power, in such a way that the label cannot be peeled off without being torn. The marking then becomes unreadable, which ensures that the marking cannot be affixed to another item.

In order to increase the safety of the marking, an alternative consists in making the marking directly on the glass item using a hot-marking technique. The marking is then engraved on the surface of the glass item, so that it is impossible to remove it without damaging the item itself.

These solutions ensure that the marking cannot be removed from its support to be affixed to another counterfeit item. However, these solutions do not allow identifying with certainty that the marking is specific to a unique glass item. Indeed, it is becoming more and more common to find on counterfeit glass items a same copy of a marking present on an original glass item. In such conditions, the marking no longer guarantee the authenticity of its support.

The present invention aims to solve this problem by proposing a method and a device for more surely associating a marking with a unique item.

OBJECT OF THE INVENTION

For that purpose, the invention proposes a method for associating a marking with an object, implementing the following steps:
   identifying the position of a marking present on an object; and
   identifying the marking shape; then
   recording in a database the marking position and shape, so that the marking position is correlated to the shape thereof.

The invention differs from the marking solutions described hereinabove in that it is associated with the specific shape of a marking at a unique position on an object. That way, the invention makes it possible to more surely associate a marking with a unique object. Indeed, the marking of an object made manually or in automated manner always shows a certain inaccuracy when it is affixed or made on a support. The invention advantageously exploits this inaccuracy by correlating the shape and the position of the marking in a database. By "correlating", it is meant a relation making it possible to identify a position from a shape or conversely. That way, the authenticity of a marking can now be checked with respect to its position on an object. Thus, the invention makes it possible to associate with certainty a marking specific to a single one support.

The steps of identifying the marking position and shape may be inverted or be carried out simultaneously.

The invention also relates to a method for associating a marking comprising several distinctive elements, implementing the following steps:
   identifying the position of at least two distinctive elements of the marking, with respect to the marking and/or to the object; and
   measuring a relative distance between at least two identified elements; then
   recording in a database the position of at least two identified elements, and the relative distance between said identified elements, in such a way that the position of two identified elements is correlated to the measurement relating to their distance.

In other words, this embodiment implements an additional measurement, making it possible to quantify an inaccuracy relating to the making of at least two distinctive elements forming the marking. The marking always shows a certain inaccuracy when it is made on a support. The invention exploits this inaccuracy by measuring the distance between at least two distinctive elements of the marking, the distance slightly varying between two identical markings due to their method of making. In other words, the invention measures characteristics that are intrinsic to each marking when they are affixed or made on a support. The value of this or these measurements are thereafter correlated to the marking shape.

The invention also relates to a method for associating a marking comprising several distinctive cavities, implementing the following steps:
   identifying the position of at least one cavity of the marking, with respect to the marking and/or to the object; and
   measuring at least one intrinsic characteristic of an identified cavity; then
   recording in a database the position of at least one identified cavity, and at least one intrinsic characteristic of the identified cavity, in such a way that the position of the cavity is correlated with at least one of its intrinsic characteristics.

According to an alternative embodiment, an intrinsic characteristic of a cavity is measured from a light pattern, reflected or transmitted by the cavity. By "intrinsic characteristic", it is meant for example the depth and/or the curvature of the cavity, and/or the size of the cavity at the surface of the object. Potentially, a same light pattern is used to measure the intrinsic characteristics of several cavities of the marking. Preferably, the pattern is made of light and is oval or rectangular in shape. According to an alternative, the light pattern can include alternations of dark fringes and clear fringes parallel to each other. According to a particular embodiment, when the marking is present on a face that is cylindrical or partially cylindrical with respect to an axis of revolution, the light pattern lights the cavities in such a way that the greatest dimension thereof is perpendicular or substantially perpendicular to the axis of revolution. An intrinsic characteristic of a cavity can be measured from the width of the light pattern inscribed in the cavity. At least two cavities can be made by a hot-marking technique. The depth of the cavities is lower than 100 μm, preferably lower than 50 μm. By "depth", it is meant a measurement made along a direction normal or substantially normal to the surface of the object wall. At a lateral face of the object, the greatest dimension of the cavities is equal to or lower than 500 μm, preferably between 400 μm and 100 μm.

According to an alternative embodiment, the marking is present on a wall at least partially transparent of the object. Preferably, the object is a glass item such as a glass container of the bottle type.

The invention also relates to a method for checking a marking on an object, implementing the following steps:
  identifying the position of a marking present on an object; and
  identifying the marking shape; then
  checking in a database established during an association method as described hereinabove that the marking position and shape actually correspond to a position and a shape correlated to each other in said database.

The invention also relates to a device for associating and/or checking the position of a marking made by hot-marking on a glass container, characterized in that it comprises:
  an optical detection system, configured to identify the position and the shape of a marking on the glass container; and
  means for memorizing the marking position and shape identified by the optical detection system;
  calculation means adapted to implement an association method as described hereinabove.

According to a particular embodiment, the association and/or checking device described hereinabove includes a telecentric optical detection system, as well as a light source adapted to project an oval, preferably rectangular, light pattern. According to a preferred embodiment, the light source projects a telecentric light beam. Potentially, the device can include an optical dioptre for focusing the light rays located at the periphery of the beam.

Of course, the different features, alternatives and implementations mentioned hereinabove can be associated with each other according to various combinations, insofar as they are not incompatible with each other or exclusive from each other.

DESCRIPTION OF THE FIGURES

The following description with respect to the appended drawings, given by way of non-limitative examples, will permit a good understanding of what the invention consists in and of how it can be implemented.

DETAILED DESCRIPTION OF AN EXEMPLARY EMBODIMENT

As mentioned hereinabove, the traceability is a major challenge to guarantee the authenticity and quality of a product. This is in particular the case in the field of glass container recycling. Indeed, the risk of breaking a glass container increases as a function of the number of recycling cycles performed. It is hence useful that this number can be accurately quantified, in order to discard the glass containers that have a too high risk of breakage.

For that purpose, it is known to use a specific marking associated with each glass container. As illustrated in [FIG. 1], a glass container 2 can include, at a lateral face 4, a specific marking in the form of a high-density two-dimensional barcode, also called Data matrix code 6. A Data matrix code is in the form of a matrix consisted of juxtaposed points or squares. According to the example illustrated in [FIG. 1], the Datamatrix code is composed of four points A, B, C and D, forming a substantially rectangular pattern.

Nevertheless, the counterfeit glass containers can also include a Datamatrix code substantially identical to that present on an original glass container. That way, the introduction of these counterfeits into the recycling cycle biases the process of counting the number of recycling cycles described hereinabove. The invention aims to solve this technical problem by proposing a method making it possible to more surely associate a specific marking to a unique glass container.

According to a first embodiment of the invention, during a first step, the position of a Datamatrix code 6 present on a lateral face 4 of a glass container 2 is measured. The glass container 2 can for example be a cylindrical, flat-bottom bottle, as illustrated in [FIG. 1]. The bottom 8 of the bottle is then used as a landmark to measure the height of the Datamatrix code 6, and the revolution axis 10 of the bottle is used as a landmark to measure the inclination of said code on the bottle. Of course, these markers are mentioned by way of example and are not intended to limit the scope of the invention. Other landmark points or axes can hence be chosen, such as the bottle neck, an edge or any other distinctive feature. The height H of the Datamatrix code is evaluated by measuring the smallest distance between an arbitrarily chosen point of the Datamatrix code, in the present case point A, and the bottom 8 of the bottle. The inclination of the Datamatrix code is evaluated by measuring the angle 9 formed between the cylindrical axis 10 of the bottle and a straight line 11 passing through the centre of two points of the Datamatrix code, for example points A and B.

Figure 1:
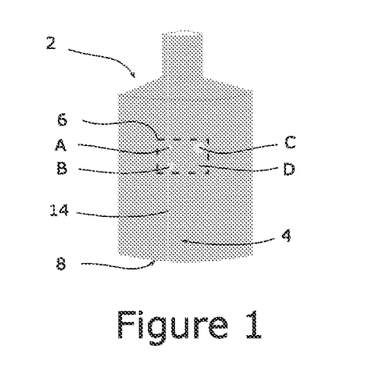
FIG. 1 is a front view of an original glass bottle of cylindrical shape, including on a lateral face an original Datamatrix code.

According to a second step, the Datamatrix code shape is identified from its contour, the arrangement of its constituent points and/or its size. Then, according to a third step, called association step, the Datamatrix code shape is associated in a database to both the height H and the inclination angle 9 measured during the first step. According to an alternative embodiment, the first and second steps may be inverted or be carried out simultaneously.

The association method can possibly include an intermediate step, consisting in identifying a specific information item from the Datamatrix code shape. This information item can then be substituted to the shape of the Datamatrix code 6 in the database. A specific information item of a Datamatrix code can indicate the site of production of glass container, its manufacturing mould and/or a series number associated with said container. Both the height H and the inclination angle 9 can then be associated in a database with either one of the information items mentioned hereinabove. For example, both the height H and the inclination angle 9 can be associated, in a database, with the site of production of the glass container.

Figure 3:
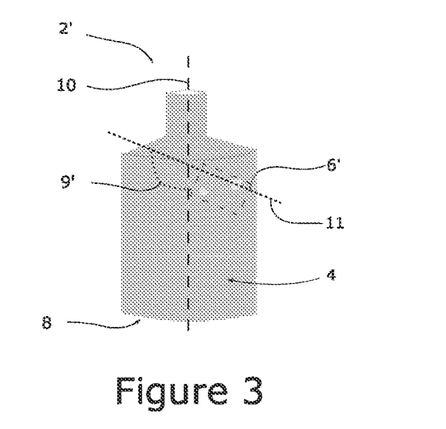
FIG. 3 shows a method for measuring the position of a copy of the Data matrix code present on the glass illustrated in [FIG. 2], present on a counterfeit glass bottle.

The invention also relates to a method for checking the originality of a Datamatrix code 6' present on a glass container 2', as illustrated in [FIG. 3]. The checking method implements the first and second steps described hereinabove. During a third step, called checking step, both the height H and the inclination angle 9' of the Datamatrix code 6', measured on the glass container 2', are compared with a height H and an inclination angle 9 previously recorded in the above-described database and associated with the shape or with an information item linked to the Datamatrix code 6. According to an alternative embodiment, the first and second steps may be inverted of be carried out simultaneously.

Figure 2:
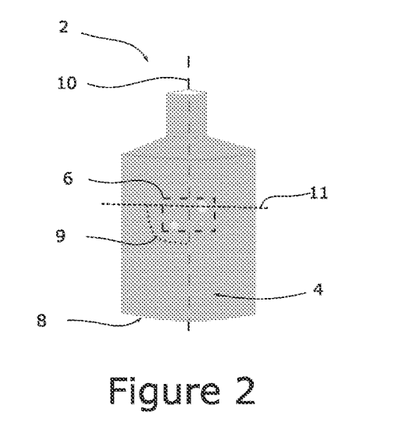
FIG. 2 shows a method for measuring the position of the Datamatrix code on the glass bottle illustrated in [FIG. 1]

The above-described association and checking methods make it possible to more surely verify that the Datamatrix code 6 present on a glass container 2 is authentic. Indeed, the application of the making of a Datamatrix code always shows a certain inaccuracy when it is arranged on an object. That way, as illustrated in FIGS. 2 and 3, the reproduction of an identical Datamatrix code on two different glass containers 2 and 2' is characterized on each glass container by slightly different height and inclination of the Datamatrix codes 6 and 6'. The association and checking methods according to the invention make it possible to detect very rapidly these differences in order to more surely identify that the glass container 24 is a counterfeit of the glass container 2, despite the fact that the Datamatrix code 6' is substantially identical to the Datamatrix code 6. The counterfeiting glass container 2' will then be identified by the invention as a counterfeit of the glass container 2 having to be discarded.

Of course, the accuracy of the measurements performed hereinabove must be equal to, preferably lower than, the uncertainty range during the application or the making of a Datamatrix code on a glass container. Now, this uncertainty depends on the technique used to stick or to make the Datamatrix code on a glass container. By way of non-limitative example, when the Datamatrix code is stuck on a glass container, its height and inclination are respectively measured with an accuracy equal to or lower than one hundredth of millimetre and an accuracy equal to or lower than one tenth of degree, respectively. When the Datamatrix code is made on a glass container, by a hot-marking technique, its height and inclination are measured with an accuracy equal to or lower than one hundredth of millimetre and an accuracy equal to or lower than one tenth of degree, respectively.

Figure 4:
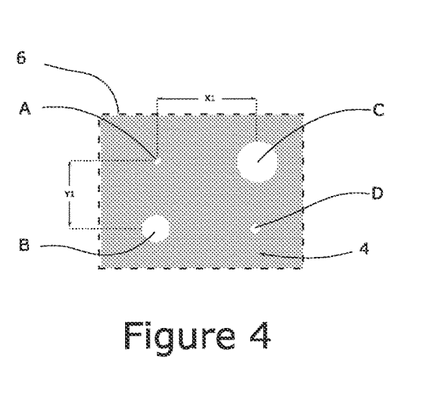
FIG. 4 shows an enlarged view of the Datamatrix code present on the bottle illustrated in [FIG. 1]

According to a second embodiment of an association method according to the invention, during a first step, the relative position between at least three points of a Datamatrix code 6 illustrated in [FIG. 4] is measured. According to the present example, the distance X1 between the centres of the points A and C and the distance Y1 between the centres of the points A and B are measured. During a second step, the shape of the Datamatrix code 6 is identified. Then, according to a third step, called association step, the shape of the Data matrix code is associated, in a database, to the measured distances X1 and Y1. According to an alternative embodiment, the first and second steps may be inverted or be carried out simultaneously. Of course, the shape of the Datamatrix code 6 can be associated with a higher number of distances measured between other points of the code.

The invention also relates to a second method for checking the originality of a Datamatrix code on a glass container, implementing the first and second steps of the second embodiment described hereinabove. During a third step, called checking step, the value of the measured distances X1' and Y1' between the points of the Datamatrix code 6' is compared with the distance values X1 and Y1 recorded for the same points in the database established hereinabove, and associated with the information item of said Datamatrix code 6. According to an alternative embodiment, the first and second steps may be inverted or be carried out simultaneously.

The second association and checking methods make it possible to more surely verify that the Datamatrix code present on a glass container is authentic. Indeed, the application or the making of a point forming a Datamatrix cod always shows a certain inaccuracy. That way, as illustrated in [FIG. 5], the reproduction of a same Datamatrix code on a counterfeit glass container will be characterized by slightly different spacings between the same points of the Datamatrix code. The glass container 2' will then be immediately identified by the invention as a counterfeit of the glass container 2, having to be discarded.

Of course, the measurements performed hereinabove must be equal to, preferably lower than, the uncertainty range for making the points of a Datamatrix code. Now, this uncertainty depends in particular on the technique used to stick or to make said points on a glass container. By way of non-limitative example, when the Datamatrix code points are printed on a glass container, their distance is measured with an accuracy equal to or lower than one tenth of millimetre, preferably with an accuracy equal to or lower than one hundredth of millimetre. When the Datamatrix code is made on a glass container, by a hot-marking technique, their distance is measured with an accuracy equal to or lower than one tenth of millimetre, preferably with an accuracy equal to or lower than one hundredth of millimetre.

By way of example, in a Datamatrix code composed of a grid of 16 points by 16 points, with a height and a width of 8 mm, the theoretical pitch between two points is of the order of 500 micrometres. The accuracy of the measurement according to the invention is equal to or lower than 10 micrometres, in such a way that the fluctuations of the Data matrix code manufacturing method as mentioned hereinabove can be measured. Usually, the measurements made to read a Datamatrix code are performed with an accuracy higher than or equal to 100 micrometres. In other words, the usual methods for reading Datamatrix codes do not measure the fluctuations of positioning of the Datamatrix points.

Figure 5:
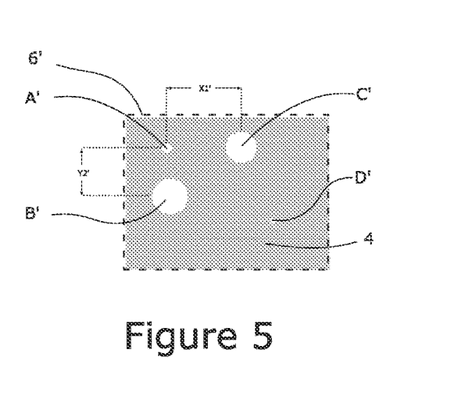
FIG. 5 shows an enlarged view of the Datamatrix code present on the bottle illustrated in [FIG. 3]

The invention also relates to a third method for associating a Datamatrix code with a unique glass container, the Datamatrix code being made by a hot-marking technique. As illustrated in [FIG. 6], the hot marking consists in making cavities 12A, 12B, 12C and 12D at a front face 14 of a glass container, by means of a LASER source, for example. As known, the cavity sizes vary as a function of the position and the inclination angle of the front face 14 with respect to the focus point of the LASER beam. For economical reasons, the hot marking is made when the glass containers 2 are conveyed from a station to another one. That way, each glass container has a substantially different position at the time of its marking, due to its displacement, with respect to the focusing point of the LASER beam. That is why, for a same point of a same Data matrix code, the position and the size of the cavity associated with said point, vary from one glass container to another, as illustrated in FIGS. 4 and 5.

Figure 6:
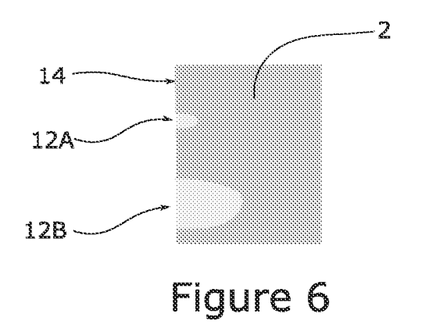
FIG. 6 shows a partial longitudinal cross-section of the bottle illustrated in [FIG. 1], at its Datamatrix code.

FIGS. 4 and 6 show a front view and a longitudinal cross-section, respectively, of a Datamatrix code 6 made by a LASER source on a glass container 2 of cylindrical shape with respect to an axis of rotation 10. Theoretically, points A, B, C and D forming the Datamatrix code 6 should be of identical size. Now, for each cavity 12A and 12B, the diameter, the depth and the convexity vary for the above-mentioned reasons. The invention proposes to advantageously use these uncertainties linked to the hot-marking technique to more surely identify the originality of the Datamatrix code 6 on an original glass container 2, from at least one measurement of the image of light pattern reflected by a cavity composing the Datamatrix code.

Figure 7:
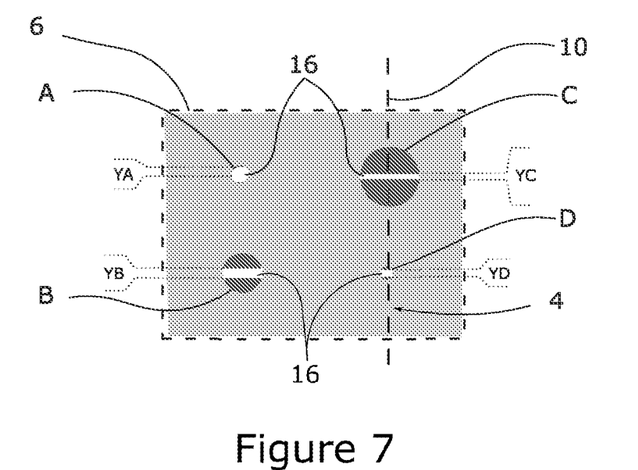
FIG. 7 shows an enlarged view of the Datamatrix code present on the bottle illustrated in [FIG. 1], lighted by a light strip.

For that purpose, according to a third embodiment of the invention for associating a Datamatrix code 6 with a unique glass container 2, during a first step, a light pattern is projected on the glass container 2 as a light strip 16. The light strip lights the glass container 2 is such a way that its greatest dimension is perpendicular or substantially perpendicular to the axis of rotation 10 of the glass container 2. The light strip 16 is sized in such a way as to light at least two points or two cavities of a Datamatrix code 6 present of a front face 14 of the bottle, preferably the whole Datamatrix code 6.

According to a second step, for at least one cavity, the width of the light strip 16 inscribed in said cavity is measured. By "width", it is meant herein a dimension of the light strip along a direction parallel or substantially parallel to the axis of rotation 10 of the glass container 2. According to the present example, the width of the light strip is measured for the four cavities: YA, YB, YC, YD. According to a third step, the shape of the Datamatrix code 6 is identified. According to an alternative embodiment, the second and third steps may be inverted or be carried out simultaneously.

During a fourth step, called association step, to the shape of the Datamatrix code 6 is associated, in a database, at least one cavity A with the measured width YA of the light strip visible in said cavity.

Figure 8:
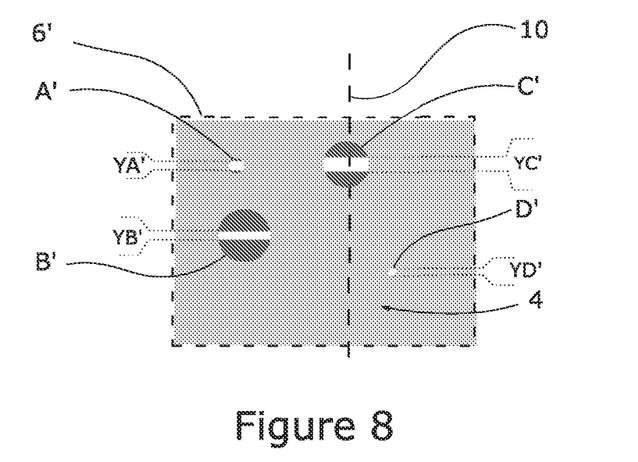
FIG. 8 shows an enlarged view of the Datamatrix code present on the bottle illustrated in [FIG. 3], lighted by a light strip.

The invention also relates to a third method for checking the originality of a Datamatrix code present on a glass container 2', the Datamatrix code being made by a hot-marking technique. The third checking method implements the first, second and third steps described hereinabove, for measuring the width YA' of a light strip 16 inscribed in at least one cavity A' and identifying the shape of the Datamatrix code 6'. According to an alternative embodiment, the second and third steps may be inverted or be carried out simultaneously. During a fourth step, called checking step, the measured value of width YA' of a light strip inscribed in a cavity A' of the Datamatrix code 6' is compared with a width YA of a light strip recorded in a database established hereinabove, corresponding to the same cavity A associated with the same shape of the Datamatrix code 6.

The third association and checking methods described hereabove make it possible to more surely verify that the Datamatrix code 6 made by a hot-marking technique on a glass container 2 is authentic. Indeed, as mentioned hereabove, the hot marking of a Datamatrix code always shows a certain inaccuracy during its making. That way, as illustrated in FIGS. 7 and 8, the reproduction of the Datamatrix code 6 on a counterfeit glass container 2' is characterized by different cavity depth and/or shape between two points of the Datamatrix code 6.

Advantageously, the invention uses this intrinsic defect of hot marking to characterize several cavities of the Datamatrix code from the image of a same light pattern reflected by said cavities. Indeed, the size of the light strip reflected by each cavity vary substantially from one cavity to another, due to the difference of depth and/or shape of said cavities. As illustrated by FIGS. 7 and 8, different widths YA and YA' can be observed for the light strips inscribed in cavities A and A', representing a same point of an original and a counterfeit Datamatrix code, respectively. This difference of widths YA and YA' mainly reflects, in the present case, depth difference between cavities A and A'. Now, as mentioned hereinabove, each cavity has a substantially unique depth due to the intrinsic uncertainties of the technique for hot marking glass bottles travelling on a conveyor. Thanks to the invention, it is hence possible to easily detect a low depth difference between two cavities representing the same point of an identical Datamatrix code. In other words, the invention makes it possible to rapidly and more surely ascertain the originality of a Datamatrix code, made by a hot-marking technique on a glass container, by simply and rapidly checking that the size of a light pattern reflected by at least one cavity of the code corresponds to the size previous recorded in a database.

Hence, advantageously, the association and checking methods according to the invention make it possible to very rapidly detect these width differences between the light strips inscribed in the cavities, in order to more surely identify that the glass container 2' is a counterfeit of the glass container 2, despite the fact that the Datamatrix codes 6 and 6' rigorously code the same information. The counterfeiting glass container 2' will then be immediately identified by the invention as a counterfeit having to be discarded.

According to an alternative of the third association and/or checking method, a calibration step is implemented. This calibration step consists in measuring the depth of several cavities using a chromatic confocal optical profilometer. In other words, the calibration step makes it possible to perform a map of the depths of the cavities forming the marking. The calibration step can be implemented before or after the first step described hereinabove. Advantageously, the calibration step makes is possible to establish a calibration curve between the measured widths of the light strips and the real depths of the cavities that reflect said light strips. The measured cavity depths can also be used as a variable for coding the Datamatrix code, for example.

Of course, the measurements made during the third association and checking methods described hereabove must be performed substantially in the same conditions in order to compare the measurements made in the best conditions. Nevertheless, according to an alternative embodiment, relative variations of light strip widths between two cavities can be compared, in order to minimize the influence of the conditions of acquisition of the measurements between the association method and the checking method. This embodiment advantageously makes it possible to get rid of the measurement uncertainties due to the measuring devices themselves.

The invention also relates to a device 18 for associating and/or checking a Datamatrix code 6, made by a hot-marking technique on a glass container 2, adapted to implement the third association and/or checking method described hereinabove. An association and/or checking device 18 according to the invention is illustrated in [FIG. 9]. The device 18 includes a telecentric optical detection system 20, a light source 22 and a semi-reflective plate 24. The semi-reflective 24 is arranged in such a way as to allow a light beam 26 emitted by the light source 22 to light the surface of a glass container 2 present in the field depth 28 of the optical detection system 20. Of course, the semi-reflective plate 24 is configured in such a way as to allow the light reflected by the glass container 2 to be perceived by the optical detection system 20.

Figure 9:
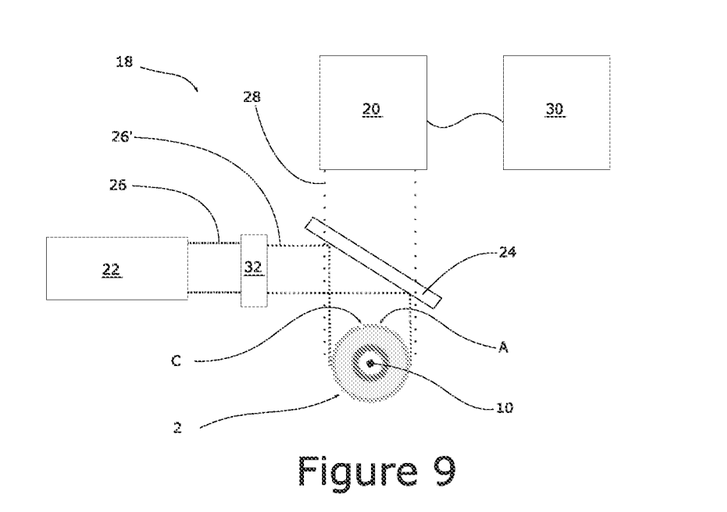
FIG. 9 is a diagram of a device according to the invention, for associating and/or checking the position of a marking made by hot marking on a glass container.

The optical detection system 20 is connected to a central unit 30. The central unit 30 comprises means for memorizing an association and/or checking method described hereinabove as well as a database. The central unit 30 also comprises calculation means adapted to implement the memorized method(s), in an automated manner or not. Potentially, the central unit 30 can include a display device allowing an operator to verify the image acquired by the optical detection system 20.

Figure 10:
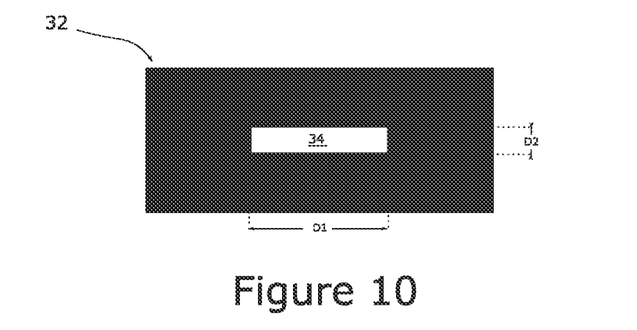
FIG. 10 shows a diaphragm belonging to the association and/or checking device illustrated in [FIG. 9]

The device 18 also includes a diaphragm 32 delimiting a rectangular aperture 36. The diaphragm 32 is interposed between the light source 22 and the semi-reflective plate 24, in such a way that the light beam 26' passing through the aperture 36 forms a light strip 16 adapted to light at least one portion of a Data matrix code 6 hot marked on a glass container 2.

The length D1 of the diaphragm 32 is chosen in such a way that the light strip 16 covers at least the length of the portion of space observed by the optical detection system 20. By "length of the portion of space", it is meant a dimension of the space observed by the optical detection system 20, along a direction perpendicular or substantially perpendicular to the optical axis of detection of the optical detection system 20. By way of non-limitative example, the length D1 is comprised between 2 cm and 20 cm, preferably between 5 cm and 15 cm.

The width D2 of the diaphragm 32 is chosen in such a way that the image of the light beam 16 can be identified in at least one cavity of a Datamatrix code made on the surface of a glass container, the cavity reflecting the light beam 26' emitted by the light source 22. In other words, the width of the diaphragm 32 must be sufficient for the optical detection system 20 to allow the central unit 30 to measure the width of the slit image, for example YA as shown in [FIG. 7], at said cavity A of the Datamatrix code 6 present on the glass container 2. By way of non-limitative example, the width D2 of the diaphragm 32 is between 0.5 cm and 5 cm, preferably between 1.25 cm and 3.5 cm.

According to the present example, the optical detection system 20 comprises a high-resolution camera provided with a 5-Megapixel optical sensor, with a macro lens allowing an observation field at 100 mm from the lens, of 20 mm by 20 mm, and a field depth of the order of 20 mm. The light source 22 includes several light-emitting diodes, configured to emit a light beam in a wavelength range included in the visible light spectrum. Preferably, the light source 22 projects a telecentric or substantially telecentric light beam.

As illustrated in [FIG. 4], the device 18 described hereinabove advantageously allows obtaining a high-contrast image with little geometric distortion, of a Datamatrix code 6 present on a lateral face 4 of a glass container 2 located in the field depth of the optical detection system 20.

When the Datamatrix code is present on a cylindrical front face 14, an orientation of the container is favoured in the field depth area 28 of the optical detection system 20, in such a way that the light strip 16 is perpendicular or substantially perpendicular to the axis of revolution 10 of said face. This embodiment advantageously makes it possible to perform measurements of the width of the light strip 16, which depends little or not on the radius of curvature of the front face 14 of the glass container 2, in a plane that is normal or substantially normal to the axis of revolution of said face.

Figure 11:
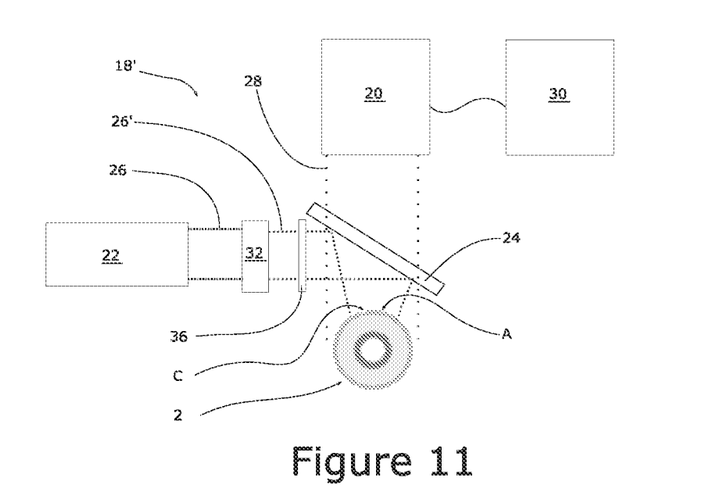
FIG. 11 shows a diagram of an alternative device according to the invention, for associating and/or checking the position of a marking made by hot marking on a glass container.

According to an alternative embodiment illustrated in [FIG. 11], a device 18' according to the invention can include an optical diopter 36 for focusing the light strip 16 at a Datamatrix code hot marked on a glass container. This embodiment is particularly advantageous when the Datamatrix code 6 is present on a convex or concave surface, to optimize the light flow and/or to obtain a homogeneous light flow, in order to limit the normal measurement aberrations and errors at any point of the curved surface, over at least the useful surface extend to be controlled. For example, a Fresnel lens 36 can be interposed between the diaphragm 32 and the glass container that is to be observed.

According to an alternative embodiment, the width D2 of the slit is adjusted as a function of the internal curvature of the cavity or cavities lighted by the light strip 16, in such a way that the width of the light strip observable by the optical detection system 20 can be measured by the central unit 30 in each cavity. It is to be noted that the hot marking of the Datamatrix points, with a LASER source, on a glass container, creates cavities whose depth and curvature vary. By way of non-limitative example, the depth of the cavities varies between 0 and 50 µm. That way, the inside of each cavity is characterized by a proper depth, reflecting the image of the light strip 16 with a different width. Hence, the width D2 of the diaphragm 32 is chosen in such a way that the edges of the diaphragm delimiting the width of the light strip 16 are both visible in at least two distinct cavities, preferably at least three distinct cavities. The width D2 of the diaphragm 32 is adjusted in such a way that the shallowest cavity of the Data matrix code reflects the image of a light strip that is the widest possible (see, for example, reference YA in [FIG. 7] and reference YD' in [FIG. 8]). This choice is motivated in order to be able to observe the opposite edges of the light beam 16 reflected in each cavity. Indeed, the shallower a cavity, the larger its equivalent focal and the wider the generated image of the light slit (see [FIG. 7] and [FIG. 8]). It is to be noted that, for a same diameter of cavities at the front face 14 of the glass container 2, the depth of the cavities can vary, which translates into light slit images of different widths. The device according to the invention hence makes it possible to precisely make the distinction between cavities that are identical at the front face 14 but with different depths. In other words, the device according to the invention exploits the optical properties of each cavity to make the distinction between said cavities as a function of their depth.

By way of non-limitative example, for the cavity depth range mentioned hereinabove, a width D2 of the diaphragm 32 between 0.5 cm and 5 cm, preferably between 1.25 cm and 3.5 cm, is chosen when the front face 4 of the glass container 2 is positioned at a distance of the order of 60 mm from the diaphragm 32.

The invention claimed is:

1. A method for associating a Datamatrix code with a glass container, the Datamatrix code comprised of plural cavities formed by hot marking on a face of the glass container, the association method comprising the following steps:
   identifying a position of a cavity of the plural cavities with respect to the Datamatrix code and/or to the glass container;
   projecting an oval-shaped or rectangular-shaped light pattern onto the glass container in such a way that the light pattern is contained within the cavity of the Datamatrix code;
   measuring a dimension of the light pattern inscribed within the cavity of the Datamatrix code;
   identifying a shape of the Datamatrix code; and
   associating, in a database, the shape of the Datamatrix code with the measured dimension of the light pattern inscribed within the cavity.

2. The method according to claim 1,
   wherein the glass container has a cylindrical surface upon which the Datamatrix code is located, and
   wherein the light pattern illuminates the cavity in such a way that a largest dimension of the cavity is perpendicular or substantially perpendicular to an axis of revolution of the glass container.

3. The method according to claim 1, wherein the cavity has a depth less than 100 µm.

4. The method according to claim 1, wherein on a surface of the glass container where the Datamatrix code is located, a largest dimension of the cavity is equal to or less than 500 µm.

5. The method according to claim 1, wherein the Datamatrix code is present on a wall of the glass container that is at least partially transparent.

6. A device for associating and/or checking a position of a Datamatrix code with a glass container, the Datamatrix code comprised of plural cavities formed by hot marking on a face of the glass container, comprising:
   an optical detection system, configured to identify the position and a shape of the Datamatrix code on the glass container;
   a central unit configured to memorize the position and the shape identified by the optical detection system; and
   a central unit adapted to implement the association method according to claim 1.

7. The device according to claim 6,
   wherein the optical detection system is telecentric, and
   wherein the optical device includes a light source adapted to project an oval light pattern.

8. The method according to claim 1, wherein the dimension measured of the light pattern, inscribed within the cavity, is a width of the light pattern.

* * * * *